Patented Aug. 31, 1943

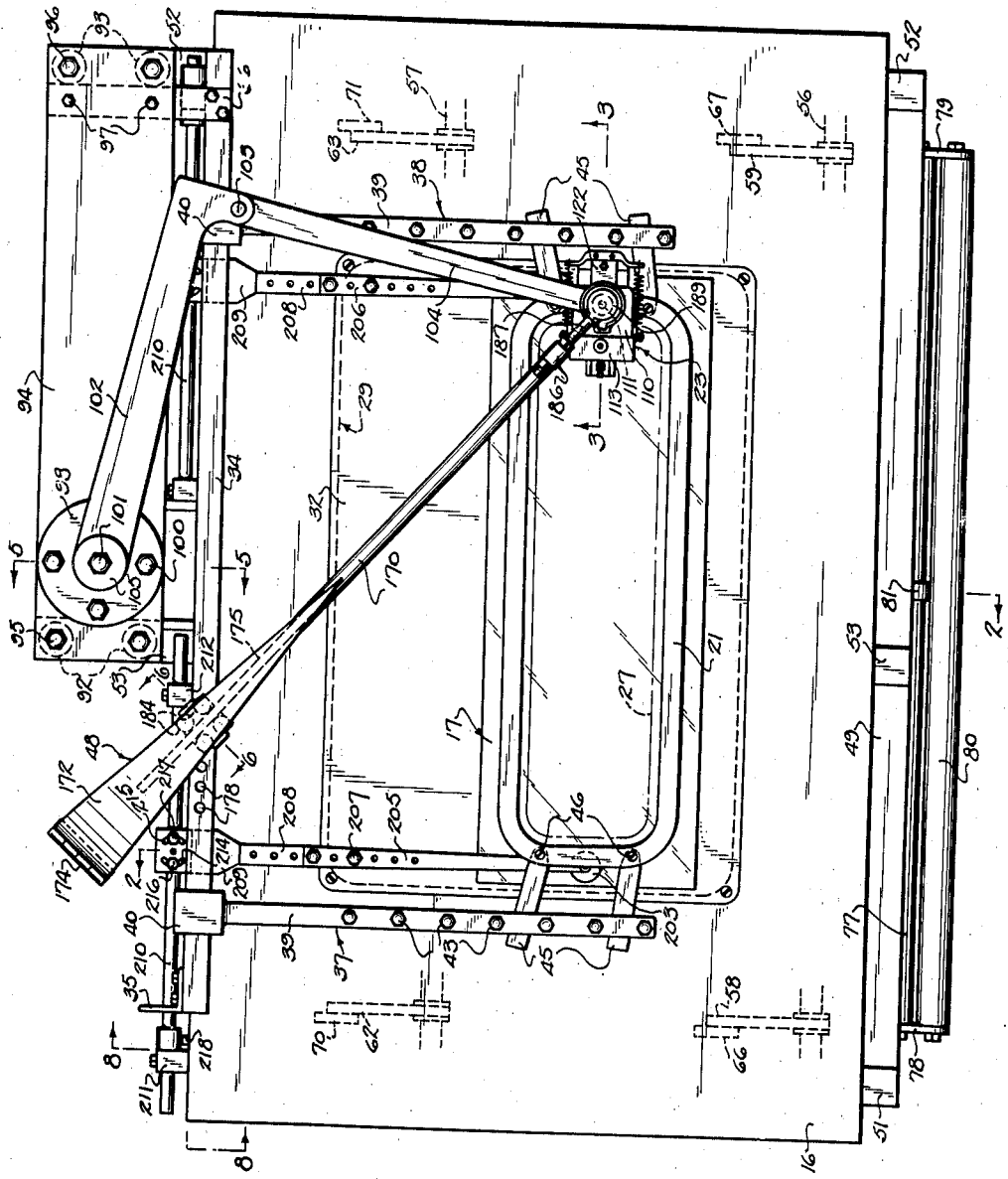

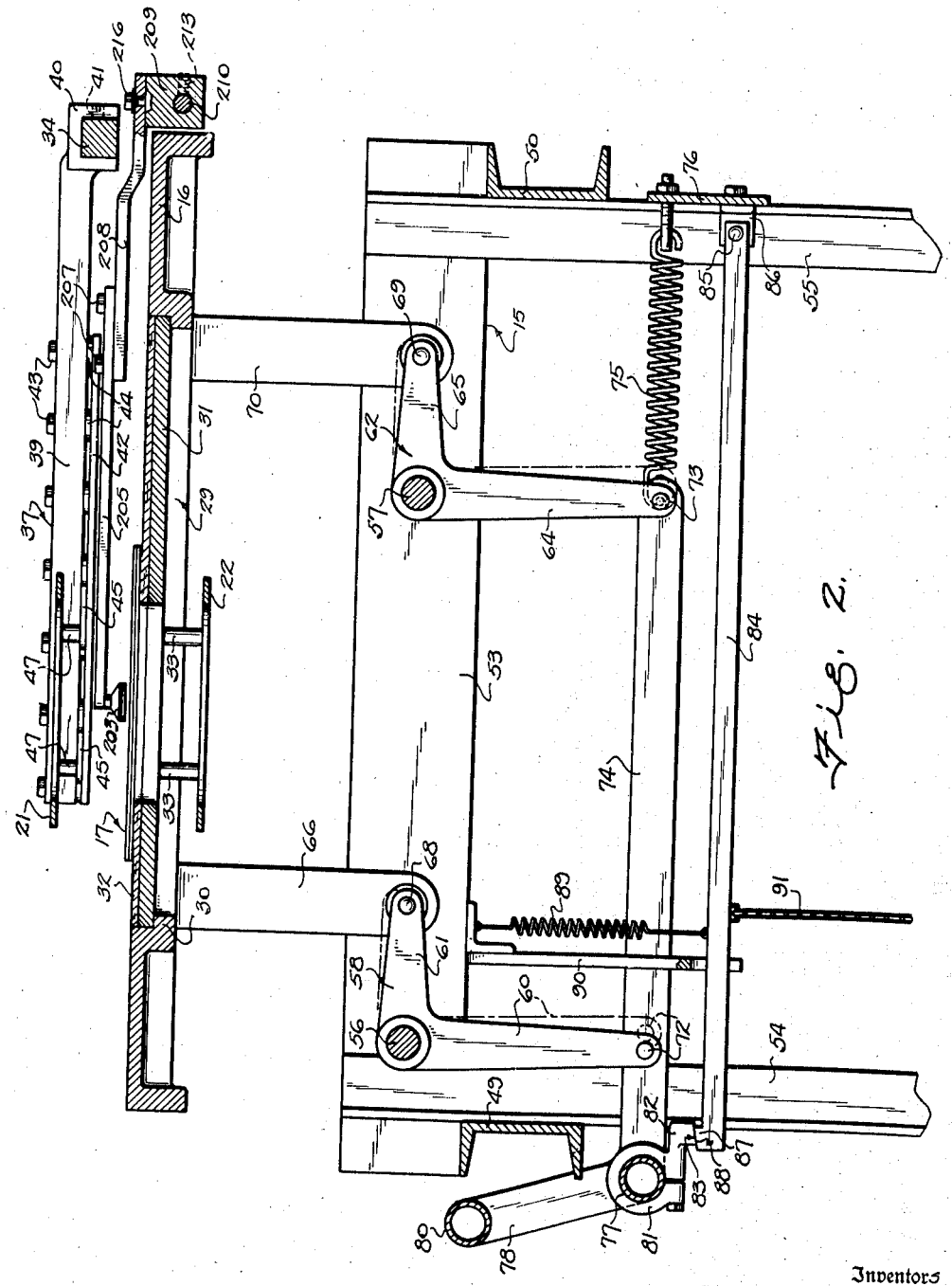

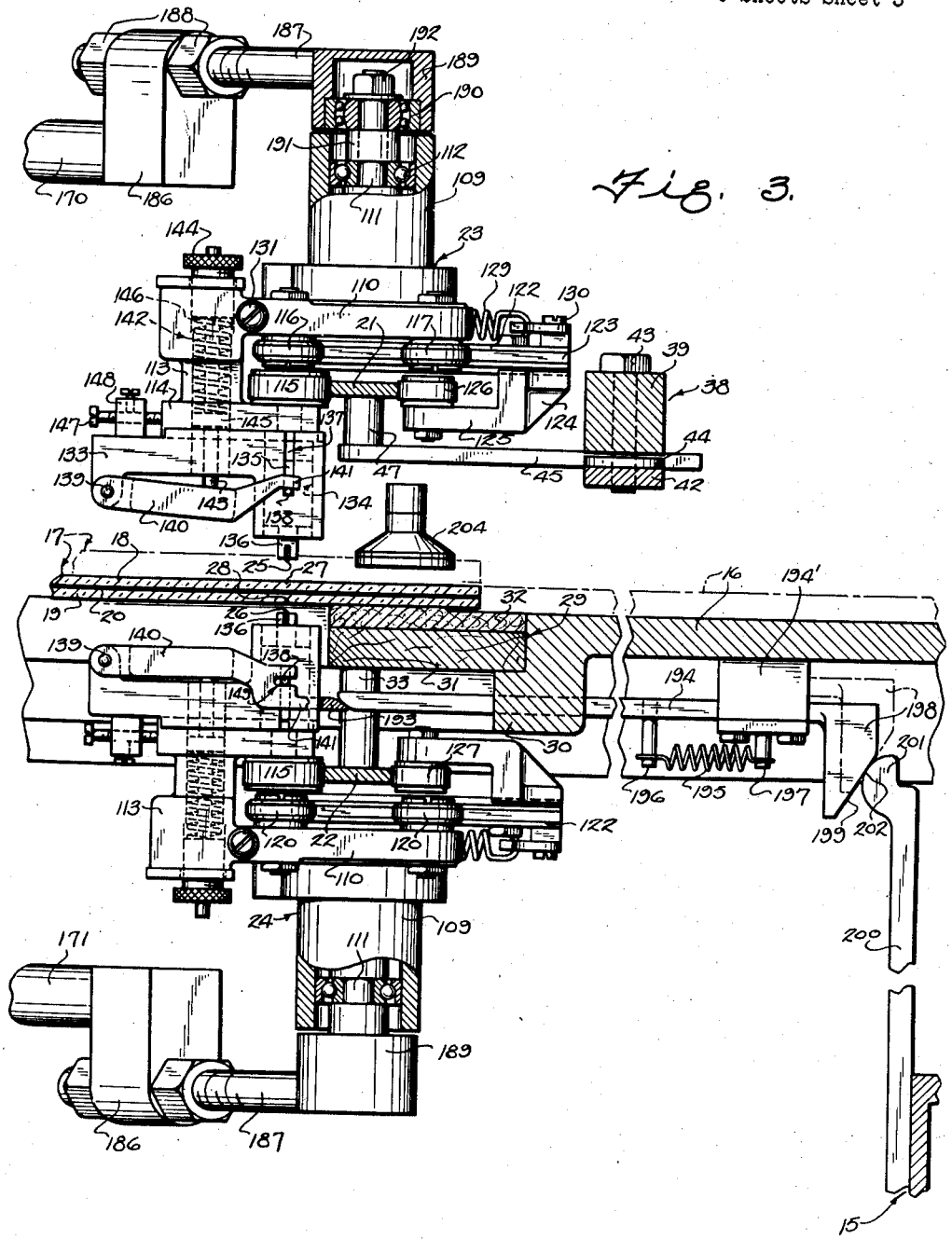

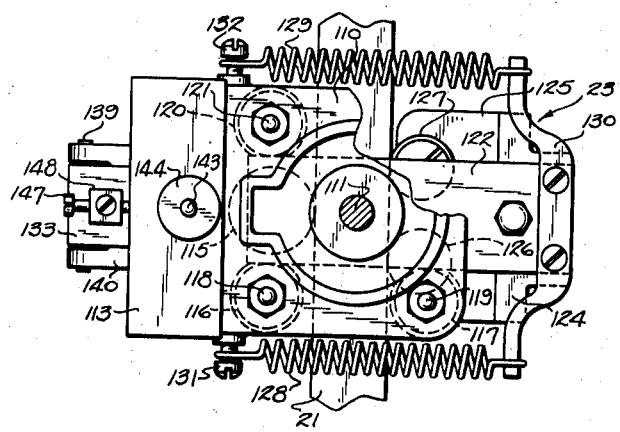

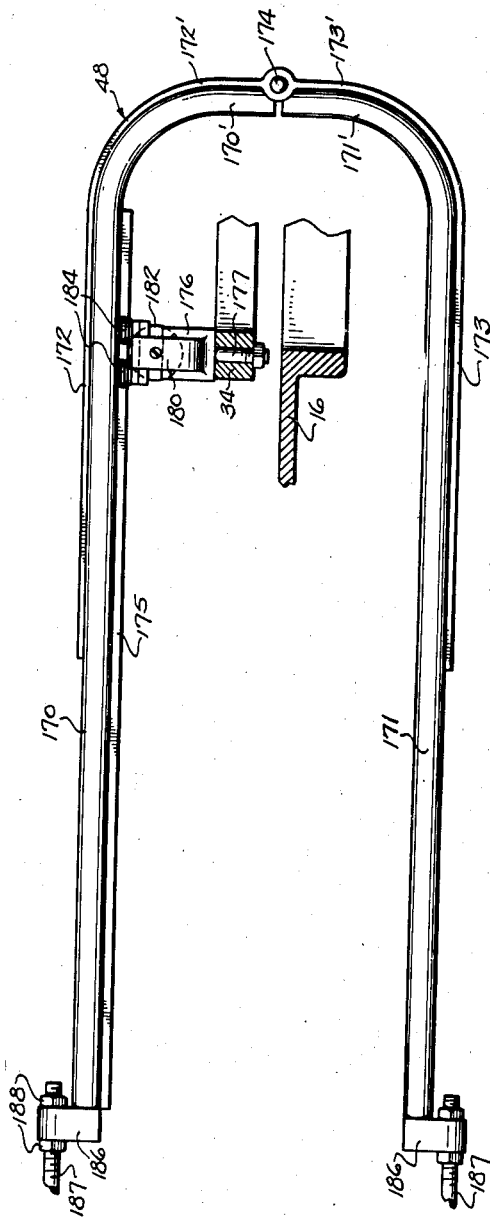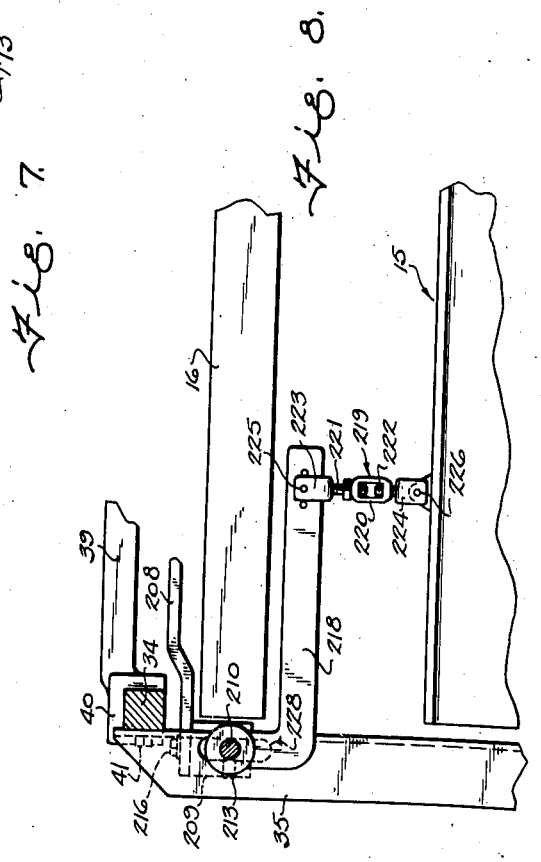

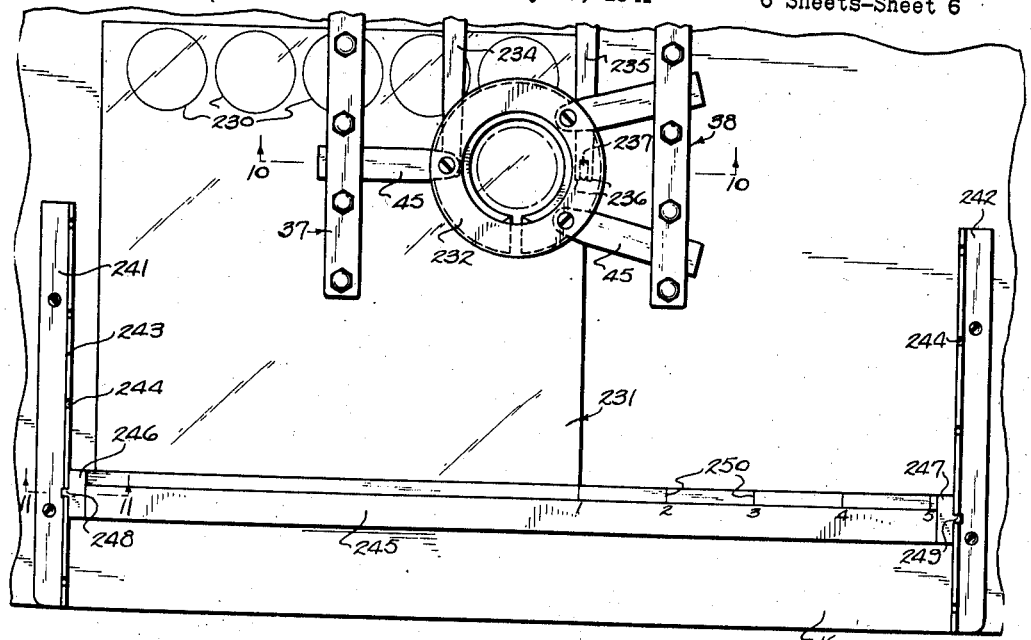
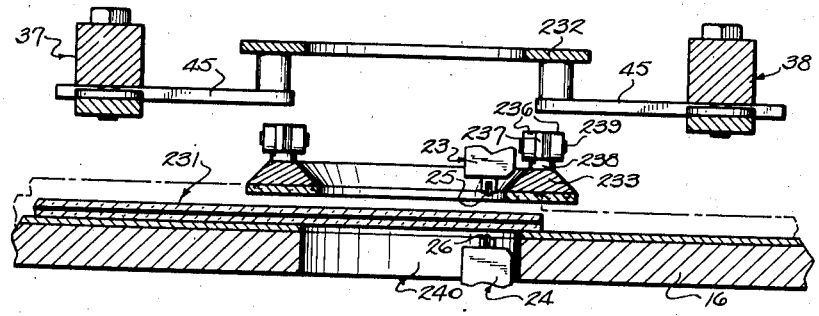
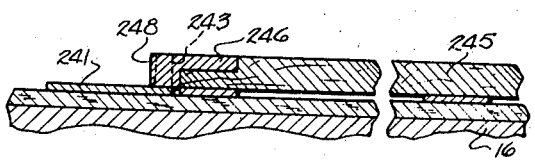

2,328,405

UNITED STATES PATENT OFFICE 2,328,405

CUTTING MACHINE

Carl B. Williams, Jr., and Melvin C. Koester, Toledo, Ohio, assignors to Libbey-Owens-Ford Glass Company, Toledo, Ohio, a corporation of Ohio Application July 17, 1941, Serial No. 402,860

15 Claims. (Cl. 33—27)

The present invention relates to cutting machines in general and more particularly to a machine for cutting glass sheets or plates.

This invention is of especial utility in the cutting of flat sheets or plates of laminated safety glass comprising two sheets of glass bonded to one another by an interposed layer of plastic material to form a composite structure. It has heretofore been customary in cutting laminated safety glass to first score one of the glass sheets and crack the same along the score line, after which the second glass sheet is scored along a line directly opposite the first score line and said second sheet then cracked along its score line. The glass is then separated along the lines of cut by stretching the plastic interlayer and the plastic finally severed by means of a razor blade or the like.

The primary aim of this invention is to provide a cutting machine of improved construction, combination and arrangement for cutting out from sheets or plates of laminated safety glass forms or lights of predetermined regular or irregular contour more rapidly, accurately and economically than in the past.

Another important object of the invention is to provide a cutting machine of the above character embodying novel mechanism by which the sheet of laminated safety glass can be simultaneously cut along two parallel oppositely disposed lines on opposite sides respectively of the composite sheet whereby both glass sheets can be cut in a single operation.

A further important object of the invention is to provide a cutting machine of the above character embodying upper and lower cutting units for scoring the outer surfaces of the two sheets of glass combined with novel mechanism for connecting said cutting units together so that they operate in unison and to insure that the score lines on the two glass sheets will be directly opposite and in alignment with one another.

Other objects and advantages of the invention will become more apparent during the course of the following description, when taken in connection with the accompanying drawings.

In the drawings, wherein like numerals are employed to designate like parts throughout the same:

Fig. 1 is a plan view of a cutting machine constructed in accordance with the present invention;

Fig. 2 is a vertical transverse section through the machine taken substantially on line 2—2 of Fig. 1;

Fig. 3 is a vertical section through the upper and lower cutting units taken substantially on line 3—3 of Fig. 1;

Fig. 4 is a plan view of the upper cutting unit, partially broken away;

Fig. 5 is a vertical section through the supporting means for the upper and lower cutting units taken substantially on line 5—5 of Fig. 1;

Fig. 6 is a detail vertical section taken substantially on line 6—6 of Fig. 1 showing the means for supporting the mechanism connecting the upper and lower cutting units together;

Fig. 7 is a side elevation of the means connecting the upper and lower cutting units;

Fig. 8 is a detail vertical section taken substantially on line 8—8 of Fig. 1 showing the actuating means for the sheet clamping members;

Fig. 9 is a plan view of a modified form of template and cutting table;

Fig. 10 is a vertical longitudinal section taken substantially on line 10—10 of Fig. 9; and Fig. 11 is a detail vertical section taken substantially on line 11—11 of Fig. 9.

Briefly, the cutting machine of this invention comprises a stationary supporting structure 15 having associated therewith a flat horizontal table top 16 for supporting the sheet or plate of laminated safety glass 17 during the cutting thereof and being vertically movable relative to said supporting structure. As shown in Fig. 3, the sheet of laminated safety glass 17 comprises the two sheets of glass 18 and 19 and an interposed layer of plastic material 20 bonded together to form a composite structure.

Arranged above the table top 16, in vertically spaced relation thereto, is a horizontal track template 21 having the same configuration as the form or light to be cut from the laminated sheet, while arranged beneath the table top 16 is a similar horizontal track template 22 corresponding in shape and size to the upper track template 21 and positioned in vertical alignment therewith. Mounted upon the track templates 21 and 22 and guided thereby are the upper and lower cutting units 23 and 24 respectively provided with the rotatable steel cutting wheels 25 and 26; said units being adapted to travel around said track templates to effect the scoring of the laminated sheet 17 along lines of cut indicated at 27 and 28 respectively (Figs. 1 and 3) which are directly opposite and in alignment with one another.

The table top 16 is substantially rectangular and provided approximately centrally thereof with a relatively large rectangular opening 29. Surrounding the opening 29 is a continuous horizontal ledge 30 upon which is removably supported a wooden frame 31 received within said opening and having secured to its upper surface a pad 32 for supporting thereupon the sheet of laminated safety glass 17 to be cut. The lower template 22 is carried by a plurality of depending hangers 33 secured to the under side of the frame 31 and is removable therewith. The upper template 21 is supported in the following manner. Extending longitudinally of the table at the rear thereof is a stationary supporting bar 34 secured at one end to a vertical angle iron 35 and at its opposite end to a strap 36. Carried by and extending forwardly from the bar 34 are the spaced parallel template supporting members 37 and 38, each comprising an arm 39 provided at its rear end with an inverted U-shaped portion 40 fitting over said supporting bar and secured thereto by a set screw or the like 41. Arranged beneath the arm 39 in spaced parallel relation thereto is a strip 42 secured to said arm by bolts 43 and maintained in spaced relation thereto by washers 44 encircling the bolts 43. Clamped between the arm 39 and strip 42 are the horizontal supporting fingers 45 to the outer ends of which the template 21 is secured by screws 46. As shown in Fig. 2, the template 21 is held spaced above the fingers 45 by sleeves 47 through which the screws 46 pass so as not to interfere with the travel of the cutting unit around the template.

In accordance with the invention, means is provided for raising the table top 16 and laminated glass sheet 17 supported thereon just prior to the cutting operation and for maintaining them in elevated position during said cutting operation, upon the completion of which the said table and sheet are lowered. The upper template 21 is therefore mounted in a fixed position whereas the lower template 22, being carried by the table top 16, moves vertically therewith to raise and lower the lower cutting unit 24 with said table top. The machine further embodies mechanism designated in its entirety by the numeral 48 for connecting the upper and lower cutting units 23 and 24 together so that they move in unison and which mechanism will not interfere with the raising and lowering of the lower cutting unit 24 with the table top 16.

The stationary supporting structure 15 for the movable table top 16 comprises a substantially rectangular horizontal frame including the longitudinally extending front and rear members 49 and 50 supporting at their opposite ends the transverse end members 51 and 52 and intermediate their ends the member 53. The supporting frame is supported at the two front corners thereof by legs 54 and at its two rear corners by vertical legs 55. Extending longitudinally of the table and rotatably carried by the transverse members 51, 52 and 53 of the supporting frame are the spaced parallel shafts 56 and 57. Fixed to the shaft 56 adjacent its opposite ends are the two bell-crank levers 58 and 59, each comprising a substantially vertical depending leg 60 and a substantially horizontal, relatively shorter leg 61. Keyed to the shaft 57, opposite bell-crank levers 58 and 59 on shaft 56, are similar bell-crank levers 62 and 63, each comprising a substantially vertical depending leg 64 and a substantially horizontal relatively shorter leg 65.

The table top 16 has secured to the under side thereof spaced brackets 66 and 67 to which the substantially horizontal legs 61 of bell-crank levers 58 and 59 are pivoted as at 68, while the substantially horizontal legs 65 of bell-crank levers 62 and 63 are pivoted as at 69 to similar brackets 70 and 71 also carried upon the under side of the table top.

The depending legs 60 of bell-crank levers 58 and 59 are connected together at their lower ends by a horizontal rod 72 and a similar rod 73 connects the lower ends of the depending legs 64 of bell-crank levers 62 and 63. The parallel rods 72 and 73 are in turn connected together adjacent each end by a horizontal link 74 so that all of the bell-crank levers will be caused to operate in unison. Fastened to the rod 73 adjacent each end thereof is one end of a tension spring 75 having its opposite end attached to a plate 76 carried by the supporting frame 15. The tension springs 75 tend to normally urge the bell-crank levers in a counter-clockwise direction to raise the table top 16, but they are not of sufficient strength to alone effect such raising.

The means for raising the table top 16 includes a rod 77 extending longitudinally between and carried by the links 74 at the forward ends thereof. Secured to the opposite ends of the rod 77 are the forwardly and upwardly extending arms 78 and 79 carrying at their upper ends a second rod 80 parallel with rod 77. When it is desired to raise the table top, it is simply necessary for the operator to push rearwardly against rod 80 whereupon the rearward horizontal movement of links 74 will rock the bell-crank levers 58—59 and 62—63 in a counterclockwise direction to move the table top upwardly. This raising of the table top will be facilitated by the action of the tension springs 75.

For the purpose of locking the table top 16 in elevated position during the cutting operation there is carried by the horizontal rod 77, intermediate its ends, a clamp 81 provided with a lug 82 having a beveled bottom surface 83. Adapted to coact with the clamp 81 is a horizontal bar 84 extending transversely of the table and pivoted at its rear end as at 85 to a bracket 86 carried by plate 76, said bar 84 being provided at its forward end with a head 87 having a beveled upper surface 88 complemental to the beveled surface 83 on lug 82 of clamp 81. The bar 84 is normally drawn upwardly by a tension spring 89 and the upward movement thereof is limited by a stop 90. With this arrangement, when the operating rod 80 is moved rearwardly to effect the raising of the table top in the manner above described, the beveled surface 83 on lug 82 of clamp 81 will slide over the beveled surface 88 on the head 87 of bar 84 and when the lug 82 is disposed entirely rearwardly of head 87 the bar 84 will be drawn upwardly by spring 89 to prevent forward movement of the clamp 81 and in consequence lock the table top in elevated position. When it is desired to lower the table top, it is simply necessary to move the bar 84 downwardly until the head 87 thereof is out of the path of lug 82 at which time the links 74 can move forwardly, whereupon the table top will move downwardly by its own weight. To effect downward movement of bar 84 a chain or the like 91 can be attached at one end thereto and at its opposite end to a suitable foot-treadle (not shown) which may be readily actuated by the operator.

The transverse members 52 and 53 of the stationary supporting frame project rearwardly beyond the table as shown in Figs. 1 and 5 and carried by said projecting end portions are the upstanding posts 92 and 93 respectively upon the upper ends of which is supported a horizontal platform 94 secured to said posts by screws 95 and 96. The strap 36 supporting one end of the horizontal bar 34 is secured to said platform 94 by bolts or the like 97. Arranged above and beneath the platform 94 adjacent one end thereof are the circular plates 98 and 99 secured to one another and also to the platform by bolts 100. Secured to the upper plate 98 is a vertical post 101 upon which is rotatably mounted the horizontal cutter supporting arm 102 to the outer end of which is hinged as at 103 a second horizontal arm 104 carrying at its outer end the upper cutting unit 23. More particularly, the supporting arm 102 is provided at its inner end with a cylindrical bearing portion 105 rotatably mounted upon ball-bearing assemblies 106 and 107 carried by post 101 and being held in place upon said post by a cap 108.

The second supporting arm 105 is provided at its outer end with a vertical cylindrical bearing portion 109 (Fig. 3) and the cutting unit 23 comprises a substantially rectangular body member 110 carrying a vertical spindle 111 freely rotatable in ball-bearing assemblies 112 arranged within bearing portion 109 adjacent the upper and lower ends thereof to facilitate the turning of the cutting unit as it travels along the template 21.

The horizontal body portion 110 of cutting unit 23 is formed at one end thereof with a cutter head 113 which lies adjacent one side of the template 21, said cutter head including a substantially horizontal base portion 114 carrying a freely rotatable roller 115 adapted to engage the adjacent side edge of the template.

Carried upon the under side of the body portion 110 at one side thereof are the opposed rollers 116 and 117 mounted upon vertical spindles 118 and 119 respectively while carried upon the under side of the body portion at the opposite side thereof are similar rollers 120 mounted upon spindles 121 and positioned in line with rollers 116 and 117. Slidably received between the rollers 116—117 and 120 is a horizontal slide plate 122 positioned above the template 21 and extending at right angles thereto, said slide plate being provided with grooves 123 in its opposite side edges to receive the rollers 116—117 and 120 therein (Figs. 3 and 4).

Secured upon the under side of the slide plate 122 at the outer end thereof is a roller support 124 having a substantially horizontal portion 125 carrying a pair of spaced apart freely rotatable rollers 126 and 127 which engage the adjacent side edge of the template 21. The roller 115 carried by cutter head 113 engages the opposite side edge of the template at a point intermediate the rollers 126 and 127. The rollers 126 and 127 carried by slide plate 122 are urged into engagement with the side edge of the template by tension springs 128 and 129 connected at one end to a transverse strap 130 carried at the outer end of slide plate 122 and at their opposite ends to screws 131 and 132 carried by the body portion 110.

Slidably associated with the base portion 114 of cutter head 113 is a horizontal plate 133 provided at its inner end with a well 134 in which is received a cylindrical cutter holder 135, said cutter holder having a depending reduced portion 136 projecting through an opening in the bottom of said well and carrying the rotatable steel cutting wheel 25.

The side wall of the well 134 is provided with aligned vertical slots 137 and carried by the cutter holder 135 are horizontal pins 138 which project outwardly through said slots. Pivoted to the outer end of the plate 133 as at 139 is a substantially horizontal lever 140 bifurcated at its inner end to provide spaced legs 141 which straddle the well 134 and engage the pins 138.

The cutter head 113 is also provided with a vertical bore 142 in which is mounted a vertical pressure pin 143, said pin projecting downwardly through an opening in the plate 133 and engaging the lever 140. Threaded within the upper end of the bore 142 is a nut 144, while formed upon the pressure pin 143 adjacent the lower end thereof is a circumferential flange 145. Arranged within the bore 142 and encircling pressure pin 143 is a compression spring 146 which bears at its upper end against the nut 144 and at its lower end against the flange 145 to normally urge the pressure pin 143 downwardly to engage lever 140. With this construction, the cutting wheel 25 will be yieldably maintained in engagement with the sheet of safety glass 17 during the cutting operation, while the pressure of the cutting wheel upon the glass can be regulated by proper adjustment of the nut 144 to control the compression of spring 146. The plate 133 may be adjusted horizontally relative to cutter head 113 to vary the position of the cutting wheel 25 by means of a set screw 147 passing through a boss 148 on the plate 133 and engaging the base portion 114 of cutter head 113.

The lower cutting unit 24 is of the same construction as upper cutting unit 23 and associated with its respective template 22 in the same manner, the principal difference being that the lower cutting unit is inverted as shown in Fig. 3 so that the cutter holder 136 projects upwardly to position the cutting wheel 26 of lower cutting unit 24 directly beneath the cutting wheel 25 of upper cutting unit 23. Also, due to the inversion of the lower cutting unit 24, the spaced legs 141 of pivoted lever 140 are provided with horizontal slots 149 for receiving the pins 138 of the cutter holder 135 therein.

The lower cutting unit 24 is also carried by supporting arms similar to the supporting arms 102 and 104 for the upper cutting unit 23, with the outer end of supporting arm 104 being formed with the bearing portion 109 in which is rotatably mounted the spindle 111 of the cutting unit. However, since the lower cutting unit 24 is movable vertically with the table top 16, it is necessary that the inner supporting arm 102 thereof be mounted to facilitate this vertical movement and such mounting means is clearly illustrated in Fig. 5. As therein shown, there is secured to the bottom circular plate 99 carried by horizontal platform 94 a depending post 150 disposed in vertical alignment with post 101 and secured at its lower end to an angle iron 151 carried by the supporting framework 15. Mounted upon the post 150 for slidable but non-rotatable movement is a sleeve 152 provided with reduced threaded end portions 153 and 154 upon which are threaded nuts 155 and 156 respectively. Carried upon the reduced end portions 153 and 154 of sleeve 152 are the ball-bearing assemblies 157 and 158 respectively maintained in place by a bushing 159 and upon which is rotatably mounted the cylindrical bearing portion 105 of the supporting arm 102 for the lower cutting unit 24.

As pointed out above, the sleeve 152 is slidable upon post 149 to permit the lower cutting unit 24 to be movable vertically with the table top 16 and to this end the said sleeve may be provided with one or more vertical slots 161 receiving pins 162 secured to post 150. To effect the raising of the lower cutting unit 24 with the table top 16 there is secured to the rear edge of said table top as at 163 a substantially C-shaped hanger bracket 164 having the spaced upper and lower horizontal portions 165 and 166 and the connecting vertical portion 167, said horizontal portions having openings 168 and 169 through which the post 150 passes. The opening 169 is relatively smaller than the nut 156 so that the sleeve 152 and associated parts are supported upon the horizontal portion 166 of bracket 164. Consequently, upon raising of the table top 16 the horizontal portion 166 of bracket 164 will serve to lift the sleeve 152 and associated parts with the table top.

The mechanism 48, connecting the upper and lower cutting units 23 and 24 together so that they operate in unison to effect the scoring of the upper and lower glass sheets 18 and 19 by the cutting wheels 25 and 26 respectively in a single cutting operation, comprises a pair of substantially horizontal parallel pipes 170 and 171 arranged respectively above and beneath the cutting table 16 and connected at their forward ends to the cutting units 23 and 24 respectively while the rear ends of said pipes are bent toward one another as indicated at 170' and 171'. Welded or otherwise suitably secured to the pipes 170 and 171 are plates 172 and 173 respectively, said plates being also provided with bent end portions 172' and 173' hinged together as at 174. Carried upon the under side of the upper pipe 170 is a rail 175 supported upon the stationary bar 34. At the back of the table is a block 176 rotatably mounted upon the upper end 177' of a bolt 177 passing through and secured to said bar. The block 176 is provided with a pair of oppositely disposed upstanding ears 179 and 180 carrying a horizontal shaft 181 upon which is mounted a freely rotatable roller 182 engaging the under side of the rail 175 and serving to support the upper pipe 170. Extending between and secured to the ears 179 and 180 is a horizontal plate 183 and carried thereby are the two pairs of rollers 184 and 185 which engage the opposite side edges of said rail 175 for guiding the same as it moves along upon roller 182. The plate 183 is provided with an opening through which the upper portion of the roller 182 projects.

Each of the pipes 170 and 171 is provided at its forward end with a head 186 and carried thereby is a horizontal stud bolt 187 held in place by nuts 188 and provided at its outer end with a circular cap 189 fitting over the outer end of the spindle 111 of the respective cutting unit. Carried within the cap 189 is a ball-bearing assembly 190 within which the projecting end of the spindle 111 is rotatably mounted, said ball-bearing assembly being secured between a collar 191 fixed to the spindle and a nut 192 threaded upon the outer end thereof. With this construction, it will be apparent that as the upper cutting unit 23 is moved around the template 21 the lower cutting unit 24 will be caused to move in unison therewith through the connecting mechanism 48. Also, that the cutting unit connecting means 48 is mounted for universal movement in a horizontal plane.

Upon raising of the table top 16, the upper surface of the laminated sheet 17 to be cut will be brought into engagement with the cutting wheel 25 of cutting unit 23 and means is provided for automatically bringing the cutting wheel 26 of lower cutting unit 24 into engagement with the bottom surface of the laminated sheet. For this purpose, the legs 141 of lever 140 are provided with horizontal extensions 193 which project beyond the well 134 and have beveled upper surfaces. Extending transversely of the table top 16 is a horizontal slide bar 194 slidable horizontally through a block 194' secured to the under side of said table top and having its forward end beveled and adapted to engage the beveled ends of legs 141. The slide bar 194 is normally urged rearwardly by means of a tension spring 195 secured at one end to a pin 196 on said slide bar at its opposite end to a pin 197 on said block 194'. The slide bar 194 is provided at its rear end with an enlargement 198 having a beveled edge 199.

Secured to the supporting frame 15 is a vertical stationary actuating member 200, the upper end portion 201 of which is offset and rounded as at 202 to engage the beveled edge 199 on slide bar 194. Thus, when the table top is in lowered position as shown in Fig. 3, the slide bar 194 engages actuating member 200 so that said slide bar is urged forwardly to engage the lever 140 and hold the cutter holder 136 down and the cutting wheel 26 out of engagement with the glass sheet. However, upon raising of the table, the slide bar 194 will move upwardly and when this occurs the spring 195 will force said slide bar rearwardly as indicated by the broken lines in Fig. 3 whereupon the forward end of said slide bar will be moved out of the path of lever 140 so that the cutter holder will be forced upwardly by spring 146 to move the cutting wheel 26 into engagement with the bottom surface of the sheet. While the table top is in raised position the cutting units 23 and 24 are moved around the templates 21 and 22 respectively to effect the scoring of the offset surfaces of the laminated sheet 17 along lines 27 and 28. When the table top is again lowered, the slide bar 194 will be forced forwardly to move the cutter holder down. The vertical movement of the cutter holder is not sufficient at any time to permit the lever to pass entirely beyond the slide bar 194.

As the table top 16 is moved upwardly to cutting position, the laminated sheet 17 is automatically clamped in place thereupon by means of the relatively soft pads 203 and 204 carried at the outer ends of horizontal supporting arms 205 and 206 respectively. Each of said arms 205 and 206 is secured by bolts or the like 207 to a horizontal supporting bar 208 carried by a block 209 fixed upon a horizontal shaft 210 rotatable in bearings 211 and 212, said block 209 being secured to said shaft by a set screw 213 (Fig. 2). The supporting bar 208 is provided with a pair of oppositely curved slots 214 and 215 swung about a common center and through which pass screws 216 and 217 for securing said bar to said block. Due to the provision of the slots 214 and 215, the respective arm 205 or 206 can be swung horizontally about the center of said slots.

As the table top 16 is moved upwardly the pads 203 and 204 are simultaneously lowered to engage the upper surface of the laminated sheet 17. To accomplish this, there is secured to each shaft 210 and L-shaped lever 218 (Fig. 8) connected at its outer end to the stationary supporting frame 15 by a turnbuckle arrangement 219 including a closed loop 220 threaded upon bolts 221 and 222 carried by clips 223 and 224 respectively pivoted as at 225 and 226 to the lever 218 and supporting frame 15 respectively. In this way, as the table top moves upwardly the shaft 210 will be raised therewith and at the same time the lever 218 being fixed at its outer end to the stationary frame 15 will cause the shaft 210 to rotate in a clockwise direction to lower the respective pad 203 or 204. The angle iron 35 is provided with a vertical slot 228 to permit vertical movement of the shaft 210 with the table top.

In the operation of the cutting machine above described, the table top 16 is normally maintained in its lowered position as indicated in full lines in Fig. 3 at which time the cutting wheel 26 of cutting unit 24 is also in its lowered position. The laminated sheet 17 to be cut is then placed upon the top of the table after which the table is raised by the operator by pushing rearwardly upon operating rod 80. As the table moves upwardly, the clamping pads 203 and 204 move downwardly as above explained to clamp the laminated sheet firmly in place. Upon raising of the table top the laminated sheet is moved to engage the cutting wheel 25 of cutting unit 23 as indicated in broken lines in Fig. 3. Simultaneously, the cutting unit 26 of cutting unit 24 is also moved upwardly to engage the under side of the laminated sheet. While the table is thus held in elevated position, the operator moves the upper cutting unit 23 around the template 21 and because of the connecting means 48 the lower cutting unit 24 moves in unison with the upper cutting unit along template 22. After the laminated sheet has been properly scored the cutting table is lowered and the cutting wheel 26 of lower cutting unit 24 moved out of engagement with the sheet.

Although the templates 21 and 22 are shown as being substantially rectangular, said templates may be of any desired shape. For instance, as illustrated in Figs. 9, 10 and 11 the machine may be employed for cutting out a number of relatively small disks 230 from the sheet or plate of laminated safety glass 231 with comparatively little modification. In this case the upper template 232 is circular and the lower template is of the same size and shape and positioned directly beneath the upper template. The upper template 232 is supported in the same manner as described above by supporting arms 37 and 38 and strips 45 carried thereby while the lower template is carried beneath the table top. Instead, however, of employing a pair of clamping pads 203 and 204 there is provided a circular clamping pad 233 carried by the horizontal supports 234 and 235, each being provided at its forward end with spaced portions 236 which embrace the upper end 237 of the support 238 for the pad 233 and connected therewith by a horizontal pin 239. The circular pad 233 can, however, be operated in the same manner as each of the pads 203 and 204 above described. The cutting units are also here designated by the numerals 23 and 24 and the cutting wheels thereof by the numerals 25 and 26 respectively. The table top 16 is provided with an opening 240 through which the lower cutting tool 26 works.

In cutting a plurality of forms such as the disks 230 from the laminated sheet 231, it is necessary after each cutting operation to move the sheet horizontally until the maximum number of disks are cut from the sheet whereupon the sheet is then moved rearwardly to permit the cutting of another row of disks. To facilitate the accurate positioning of the sheet by the operator to permit the maximum of disks to be cut therefrom with the least possible waste, there is carried along opposite ends of the table top 16 the spaced parallel guides 241 and 242, each being provided with a vertical side wall 243 having vertical slots 244 in the upper edge thereof spaced from one another a distance slightly greater than the diameter of the disks to be cut. Extending longitudinally of the table between the guides 241 and 242 is a straight edge 245 provided at its opposite ends with cap members 246 and 247 having projections 248 and 249 which fit into the slots 244 in guides 241 and 242. The straight edge 245 is graduated as at 250 and these graduations may be numbered "1, 2, 3, 4 and 5," if desired, to indicate the successive positions in which the laminated sheet is to be placed, the distance between each graduation 250 being also slightly greater than the diameter of the disks. Thus, in the position shown in Fig. 9, the laminated sheet 231 is in its furthermost position to the left of the table with the right-hand edge thereof in alignment with graduation "1" for cutting the first disk 230. The laminated sheet is then moved to the right to align with graduation "2" and another disk cut and so on until all five disks have been cut. The straight edge 245 is then lifted and moved rearwardly to engage the next set of grooves 244 in guides 241 and 242 and the operation above described repeated to cut out another row of disks. This operation is continued until the maximum number of disks have been cut from the laminated sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a machine for cutting sheet glass and the like, a table for supporting the sheet to be cut, templates mounted horizontally above and beneath said table in vertical alignment with one another, a cutting unit mounted to travel along each template and including a cutting tool for scoring the respective surface of the sheet, means tying said cutting units together so that they move in unison along said templates comprising upper and lower horizontal members arranged transversely above and beneath said table, said upper and lower horizontal members being connected at their forward ends to the upper and lower cutting units respectively and secured at their rear ends to one another, a rail carried by the upper horizontal member, and supporting means for said horizontal members freely rotatable about a vertical axis and including a roller freely rotatable about a horizontal axis and along which said rail is movable.

2. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, and means for connecting said cutting units together so that they move in unison along said templates.

3. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means for connecting said cutting units together so that they move in unison along said templates, and means supporting said cutting unit connecting means for universal movement in a horizontal plane.

4. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means tying said cutting units together so that they move in unison along said templates comprising upper and lower horizontal members arranged transversely above and beneath said table, said upper and lower horizontal members being connected at their forward ends to the upper and lower cutting units respectively and hinged at their rear ends to one another, and means supporting said horizontal members for slidable and rotatable movement in a horizontal plane.

5. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means tying said cutting units together so that they move in unison along said templates comprising upper and lower horizontal members arranged transversely above and beneath said table, said upper and lower horizontal members being connected at their forward ends to the upper and lower cutting units respectively and hinged at their rear ends to one another, a rail carried by the upper horizontal member, and supporting means for said horizontal members freely rotatable about a vertical axis and including a roller freely rotatable about a horizontal axis and along which said rail is movable.

6. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means for raising said table to bring the upper surface of the sheet into engagement with the cutting tool of said upper cutting unit, and means operable upon raising of said table for moving the cutting tool of said lower cutting unit upwardly relative to the said table and into engagement wtih the bottom surface of said sheet.

7. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means connecting said cutting units together so that they move in unison along said templates, means for raising said table to bring the upper surface of the sheet into engagement with the cutting tool of said upper cutting unit, and means operable upon raising of said table for moving the cutting tool of said lower cutting unit upwardly relative to the said table and into engagement with the bottom surface of said sheet.

8. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means for raising said table to bring the upper surface of the sheet into engagement with the cutting tool of said upper cutting unit, and means operable upon raising of said table for moving the cutting tool of said lower cutting unit upwardly relative to the said table and into engagement with the bottom surface of said sheet, said last-named means also acting to move the cutting tool of the lower cutting unit away from the sheet when the table is lowered after the cutting operation.

9. In a machine for cutting sheet glass and the like, a vertically movable table for supporting the sheet to be cut, a template mounted in fixed horizontal position above the table, a second template arranged beneath said table in vertical alignment with the upper template and movable vertically with the said table, a cutting unit mounted to travel along each template and including a cutting tool for scoring the respective surface of the sheet, means connecting said cutting units together so that they move in unison along said templates, means supporting said cutting unit connecting means for universal movement in a horizontal plane, means for raising said table to bring the upper surface of the sheet into engagement with the cutting tool of said upper cutting unit, and means operable upon raising of said table for moving the cutting tool of said lower cutting unit upwardly relative to the said table and into engagement with the bottom surface of said sheet, said last-named means also acting to move the cutting tool of the lower cutting unit away from the sheet when the table is lowered after the cutting operation.

10. In a machine for cutting sheet glass and the like, a vertically movable table for supporting the sheet to be cut, a template mounted in fixed horizontal position above the table, a second template carried upon the under side of said table in vertical alignment with the upper template and movable vertically with the said table, a cutting unit mounted to travel along each template and including a cutting tool for scoring the respective surface of the sheet, means for raising said table to bring the upper surface of the sheet into engagement with the cutting tool of the upper cutting unit, and means including a horizontally slidable element actuated upon raising of said table for causing the cutting tool of said lower cutting unit to move vertically relative to said table to engage the bottom surface of said sheet.

11. In a machine for cutting sheet glass and the like, a vertically movable table for supporting the sheet to be cut, a template mounted in fixed horizontal position above the table, a second template carried upon the under side of said table in vertical alignment with the upper template and movable vertically with the said table, a cutting unit mounted to travel along each template and including a cutting tool for scoring the respective surface of the sheet, means connecting said cutting units together so that they move in unison along said templates, means for raising said table to bring the upper surface of the sheet into engagement with the cutting tool of the upper cutting unit, and means including a horizontally slidable element actuated upon raising of said table for causing the cutting tool of said lower cutting unit to move vertically relative to said table to engage the bottom surface of said sheet.

12. In a machine for cutting sheet glass and the like, a vertically movable table for supporting the sheet to be cut, a template mounted in fixed horizontal position above the table, a second template carried upon the under side of said table in vertical alignment with the upper template and movable vertically with the said table, a cutting unit mounted to travel along each template and including a cutting tool for scoring the respective surface of the sheet, means for raising said table to bring the upper surface of the sheet into engagement with the cutting tool of the upper cutting unit, and means including a horizontally slidable element actuated upon raising of said table for causing the cutting tool of said lower cutting unit to move vertically relative to said table to engage the bottom surface of said sheet, said horizontally slidable elements also acting to move the cutting tool of the lower cutting unit away from the sheet when the table is lowered after the cutting operation.

13. In a machine for cutting sheet glass and the like, a vertically movable table for supporting the sheet to be cut, a template mounted in fixed horizontal position above the table, a second template carried upon the under side of said table in vertical alignment with the upper template and movable vertically with the said table, a cutting unit mounted to travel along each template and including a cutting tool for scoring the respective surface of the sheet, means connecting said cutting units together so that they move in unison along said templates, means supporting said cutting unit connecting means for universal movement in a horizontal plane, means for raising said table to bring the upper surface of the sheet into engagement with the cutting tool of the upper cutting unit, and means including a horizontally slidable element actuated upon raising of said table for causing the cutting tool of said lower cutting unit to move vertically relative to said table to engage the bottom surface of said sheet, said horizontally slidable element also acting to move the cutting tool of the lower cutting unit away from the sheet when the table is lowered after the cutting operation.

14. In a machine for cutting sheet glass and the like, a vertically movable table for supporting the sheet to be cut, clamping means above the table adapted to engage the upper surface of the sheet upon raising of said table, means for rockably mounting said clamping means upon said table so that it is movable vertically therewith, and means for rocking the said clamping means upon raising of the said table to lower the same into engagement with said sheet.

15. In a machine for cutting sheet glass and the like, a vertically movable table for supporting the sheet to be cut, clamping means above the table adapted to engage the upper surface of the sheet upon raising of said table, a horizontal shaft rockably carried by said table and upon which said clamping means is secured, and means attached to said shaft for rocking the same upon raising of the said table to lower the clamping means into engagement with the sheet.

CARL B. WILLIAMS, Jr.
MELVIN C. KOESTER.